United States Patent [19]

Coppage, Jr. et al.

[11] Patent Number: 5,536,553
[45] Date of Patent: Jul. 16, 1996

[54] PROTECTIVE FABRIC COMPRISING CALENDERED SUB-PLIES OF WOVEN FABRIC JOINED TOGETHER BY STITCHING

[75] Inventors: Edward A. Coppage, Jr., Oakton; Richard W. Coppage, Centerville; David W. Pisenti, Fredricksburg; Richard D. Bright, Leesburg; David B. Strum, Falls Church, all of Va.

[73] Assignee: Safariland, Ltd., Inc., Ontario, Calif.

[21] Appl. No.: 426,073

[22] Filed: Apr. 21, 1995

[51] Int. Cl.$^6$ ............... B32B 3/06; F41H 1/02; F41H 5/08; A41D 13/00
[52] U.S. Cl. ............ 428/102; 2/2; 2/2.5; 89/36.01; 89/36.05; 428/229; 428/233; 428/252; 428/911; 428/902
[58] Field of Search .................. 428/102, 229, 428/233, 252, 911, 902; 2/2, 2.5; 89/36.01, 36.05

[56] References Cited

U.S. PATENT DOCUMENTS

| | | | |
|---|---|---|---|
| 3,924,038 | 12/1975 | McArdle et al. | 428/49 |
| 4,316,404 | 2/1982 | Medlin | 89/36 H |
| 4,403,012 | 9/1983 | Harpell et al. | 428/290 |
| 4,457,985 | 7/1984 | Harpell et al. | 428/224 |
| 4,501,856 | 2/1985 | Harpell et al. | 525/240 |
| 4,522,871 | 6/1985 | Armellino, Jr. et al. | 428/252 |
| 4,608,717 | 9/1986 | Dunbavand | 2/2.5 |
| 4,623,574 | 11/1986 | Harpell et al. | 428/113 |
| 4,650,710 | 3/1987 | Harpell et al. | 428/263 |
| 4,681,792 | 7/1987 | Harpell et al. | 428/102 |
| 4,737,402 | 4/1988 | Harpell et al. | 428/252 |
| 5,008,959 | 4/1991 | Coppage, Jr. et al. | 2/2.5 |
| 5,112,667 | 5/1992 | Li et al. | 428/113 |
| 5,179,244 | 1/1993 | Zufle | 89/36.02 |
| 5,343,796 | 9/1994 | Cordova et al. | 89/36.02 |
| 5,395,671 | 3/1995 | Coppage, Jr. et al. | 428/102 |

*Primary Examiner*—James Withers
*Attorney, Agent, or Firm*—Wise & Gilman

[57] ABSTRACT

There is disclosed a bullet resistant fabric which is capable of withstanding the penetration of a 9 mm or a .357 magnum bullet, has an areal density fo about 0.65 to 0.87 pound per square foot, and which is made up of a plurality of quilted together sub-plies of woven fabric having substantially no binder or matrix resin associated therewith.

13 Claims, No Drawings

PROTECTIVE FABRIC COMPRISING CALENDERED SUB-PLIES OF WOVEN FABRIC JOINED TOGETHER BY STITCHING

This invention relates to a novel fabric for use in protecting objects, notably the human body, against the penetration thereinto of incoming projectiles. This is commonly referred to as a bullet-resistant vest. It more particularly refers to a novel, very lightweight, fabric which will offer protection against penetration of a 9 mm or a 0.357 magnum projectile dischrged from a firearm.

BACKGROUND OF THE INVENTION

Body armor has been around for a long time. In general, the desire is to make the body armor as light and as breathable as possible and still withstand the impact of incoming projectiles. In recent years, some body armor has been made from a combination of a woven and a non-woven fabric each of which comprise filaments of very high molecular weight polymers, suitably polyolefins, such as ultra high molecular weight, extended chain polyethylene or polypropylene; polyesters, polyvinyl alcohols, nylons and aramid polymers. Reference is here made to U.S. Pat. No. 4,737,402 in the name of Harpell et al. which has an excellent discussion of the chemical nature of these filaments which have been found to be well suited to use in protective fabrics. The entire contents of this patent are hereby incorporated herein by reference. The object of these fabrics is to cause the incoming bullet to expend its energy elongating, distorting, and even possibly breaking the filaments of the fabric, and therefore lose its impetus to penetrate the object being protected by the fabric.

It has recently been found, see U.S. Pat. No. 5,395,671, the entire substance of which is incorporated herein by reference, that a certain construction of a composite fabric, comprising a first element which comprises multi-layers of high molecular weight woven fabric and a second element which comprises multi-layers of non-woven fabrics assembled in a particular manner, has unusual ability to stop the penetration of even very high energy projectiles, such as a very high energy projectile issuing from a .44 magnum bullet. This fabric comprised two independent layers of material. That is the two layers of material with each layer being composed of a plurality of sub-layers. In this structure, the two elements are not attached to each other.

The side of the fabric facing in the direction from which the projectile is incoming is suitably made of multiple sub-layers or plies of non-woven fabric, comprising very high molecular weight polymer filaments. The side of the fabric disposed away from the incoming direction of the projectile, and toward the object in need of protection, is suitably made up of multiple sub-layers or plies of woven fabric, comprising high molecular weight polymer filaments, which woven sub-layers or plies have been quilted together. The fact that only the sub-layers or plies of the woven fabric are quilted together and the fact that the plies of non-woven fabric are disposed toward the incoming projectile are essential criteria of the invention of the '671 patent because it is the combination of these two elements which causes the finished composite fabric to have its unusual and unexpectedly effective stopping power.

The composite fabric of the '671 patent is an excellent protective material from which excellent protective garments are made. However, because this composite fabric was intended to stop a projectile, issuing from a 240 grain .44 magnum bullet, traveling at an impact velocity of not less than 1450 feet per second, the fabric is necessarily fairly thick. It is made up many layers of both woven and non-woven sub-layers which have been assembled as aforesaid. Because this fabric has to have this exceptional stopping power, and is thus necessarily made up of these multiple layers of woven and non-woven fabrics, it is also fairly stiff. The requirement of this fabric that it stop a projectile issuing from a .44 magnum bullet, requires that there be a substantial number of layers of non-woven fabric in this composite. The use of such multiple layers of non-woven fabrics, made of high molecular weight polymer filaments which suitably have been stabilized and joined together by a matrix of resin, makes the fabric stiff and therefore less than ultimately comfortable to the wearer. Further, also because of the presence of the matrix resin, this fabric does not breath as well which adds to the discomfort of the wearer.

Despite the need for serious impact protection which is answered by the fabric of the '671 patent, because of its unique structure, this special fabric structure has been assembled with a rather low overall areal density of about 0.95 to 1.15 pounds per square foot. It has been found that with this special structure, it is possible to make up this composite fabric in such a relatively low areal density and still stop a projectile from a .44 magnum bullet traveling at an impact velocity of not less than 1,450 feet per second. This was a most unusual property at the time of the invention of the fabric of the '671 patent, and therefore this fabric has found some commercial success for body armor of the level IIIA type.

Stiff protective clothing, particularly such clothing which has a very tight weave or disposition of filaments, and even more particularly such clothing which comprises layers of non-woven fabric stabilized in a matrix resin, has a degree of discomfort to the wearer in direct proportion to its stopping power, which is a function of its areal density and its flexibility. For the same polymer filaments, it is axiomatic that the higher the areal density of the fabric, the lower is its flexibility and its breathing power, and therefore the greater is the stopping power of the fabric. It is also a fact that, for fabrics made up of the same filaments, the more non-woven fabric used in a protective composite fabric, the stiffer it is because the matrix resin causes it to have progressively fewer void spaces. The ultimate in stiffness and lack of void spaces in a protective garment is the solid metal armor of the knights of old. This solid metal armor protective garment had no void spaces and its areal density was that of the iron from which it was made. It was also infinitely stiff, having the same bending ability as any solid metal armor plate. One can only imagine how uncomfortable this iron armor must have been to wear; but it did offer excellent protection against the incoming missiles of the day, such as rocks and arrows, and other dangerous things such as swords.

In modern protective clothing, it is desired to strike a balance between the power of the garment or fabric to stop an incoming projectile, and the degree of discomfort the wearer is willing to put up with. If the fabric has too few filaments, or if the molecular weight and denier of the filaments making up the fabric is too low, or if the fabric is too thin, there will be insufficient protection afforded the wearer, and the fabric will not have achieved its purpose of protection. The direction in which this art is going is consistent with the direction in which the power of guns is going. That is, with time, the impact velocity and penetrating power of projectiles has continued to increase, and therefore, the stopping power of protective garments has also increased. This has been accomplished by using stronger and higher molecular weight filaments, by increasing the weight of the fabric, by using a non-woven fabric which has been stabilized by embedding the fabric in a matrix resin, and by assembling the fabric from different elements, such as both woven and non-woven fabrics, which provide different, and cumulatively superiorly effective, kinds of stopping power. However, along with this need to make the protective fabric more able to resist the penetration of high energy projectiles, it is also desired to lighten the fabric and make it more comfortable to the wearer.

OBJECTS AND BRIEF DESCRIPTION OF THE INVENTION

It is therefore an object of this invention to provide a lightweight, novel fabric which provides at least level II stopping power.

It is another object of this invention to provide a novel fabric which is capable of stopping the penetration of an FMJ projectile impacting the fabric at a velocity of not less than 1175 feet per second which has been fired from a 9 mm, 124 grain bullet.

It is a further object of this invention to provide a novel fabric which is capable of stopping the penetration of a JSP projectile impacting at a velocity of not less than 1395 feet per second which has been fired from a .357 magnum, 158 grain bullet.

It is a still further object of this invention to make a protective fabric which is good against a level II threat, but which is very comfortable to wear.

Other and additional objects will become apparent from a consideration of this entire specification, including the claims appended hereto.

In accord with and fulfilling these objects, the protective fabric of this invention consists essentially of a plurality of sub-layers or plies of fabric. Most, and preferably all, of these fabrics are made up of filaments having a size of about 180 to 420 denier. However, some of the fabrics may be made of filaments of a different denier; and/or some of the filaments in some or all of the fabrics may have different denier, so long as the proportion of these other filaments does not exceed about 10% based on the whole number of filaments. The filaments making up the sub-fabrics of this invention, and the sub-fabrics comprising them, and the composite fabrics made from these sub-fabrics have not been embedded in matrix resin. The omission of the separate element made up of a plurality of separate non-woven fabrics embedded in a resin matrix, as disclosed in the prior art protective fabrics is an essential part of this invention. The fact that the protective fabric of this invention is made up exclusively or at least predominantly of sub-plies of woven, rather than stabilized non-woven fabrics in a resin matrix, is an essential element of this invention. The quilting of the multiple plies of high molecular weight fabric, which is substantially free of embedding resin matrix, is an essential element of this invention. It is essential that this quilting be close enough together to impart projectile-stopping-power required of this fabric, and yet far enough apart to maintain the desired flexibility and comfort in the finished composite fabric.

This composite multi-layer fabric structure of this invention is made up of quilted sub-layers or plies of fabrics, at least most of which are made up of woven filaments comprising high molecular weight polymers. The quilted composite fabric, absent matrix resin, of this invention has an areal density of not greater than about 0.87 pound per square foot, preferably not more than 0.75 pound per square foot. In order to stop the incoming projectile from a bullet as aforesaid, it appears necessary that the fabric have an areal density of at least about 0.65 pound per square foot. It has been found that there is an intimate relationship between the areal density of the composite fabric of this invention, and the frequency and extent of quilting of the composite fabric, on the one hand, and the flexibility of the composite fabric on the other. There is also an essential relationship between the areal density of the matrix resinless composite fabric of this invention and the spacing and extent of quilting, and the projectile stopping power of the fabric. These are essential relationships to the characterization of this invention. The end product composite fabric of this invention is further characterized as exhibiting a backface deformation of not more than about 44 mm when impacted by a projectile fired from either: a 9 mm, 124 grain bullet impacting at a velocity of not less than 1175 feet per second; or a .357 magnum, 158 grain bullet impacting at a velocity of not less than 1395 feet per second.

Within the context of this description of this invention, it is recognized that the filaments which make up the sub-plies of the protective fabrics hereof are made of high molecular weight polymers. These high molecular weight polymers are sometimes referred to in the art as resins. It is also recognized that an important aspect of this invention is that the individual sub-plies of fabric and the composite, quilted fabric as whole should not have a significant amount of stabilizing resin matrix in which the filaments or the fabrics are embedded.

It is considered possible that the term "resin" could be confused in the context of this invention. It has been attempted to exercise care in this specification to use the term "resin" only in connection with the matrix or binder material in which prior art fabrics have been embedded; and to use the term "polymer" in connection with the high molecular weight materials which comprise the filaments of this invention.

Thus, in this context of this invention, the protective fabric of this invention consists essentially of a plurality of sub-plies of fabric, at least most (at least about 80%, and preferably 100%) of which are woven fabric. At least a substantial number, and preferably all, of these sub-plies are quilted together. The composite fabric of this invention may have some plies of non-woven fabric amongst the required plies of woven fabric. However, even if plies of non-woven fabric are employed, they should not have matrix resin associated with them. There should not be any matrix resin associate with the plies of woven fabric. Although it is preferred to have no matrix resin associated with the fabric of this invention, it is considered to be within the scope of this invention, however, to permit up to about 10% by weight of the fabric to be matrix resin. In the case where the matrix resin is a pliable material, such as a rubber based material, it is possible to use up to about 15% by weight without detracting too much from the wearability of the fabric of this invention.

DETAILED DESCRIPTION OF THIS INVENTION

According to this invention, the instant fabric preferably consists essentially of a plurality of quilted together plies of woven fabrics, each ply of which comprises a multiplicity of filaments of high molecular weight polymers, such as polyolefins or aramids. The use of other polymers is also within the scope of this invention. It is essential that, whichever polymer filaments are used, they must have a minimum tensile modulus of about 160 grams/denier and a tenacity of at least about 7 grams per denier. The fibers used in forming the woven fabrics of this invention preferably have a minimum tensile modulus of 300 grams per denier and a tenacity of at least 15 grams per denier.

Different filament materials possess somewhat different physical properties, and therefore the minimum values of these physical properties differ slightly for different materials in order for them to be useful in this invention. These properties are generally known and have been previously reported. Specific reference is made to U.S. Pat. No. 4,681,792, which describes different polymer filaments which are useful in protective fabrics and garments, and are therefore useful in this invention. The entire contents of this patent is hereby incorporated herein by reference.

Where polyethylene filaments are used, they preferably have a minimum weight average molecular weight of 500,000, a minimum tensile modulus of 500 grams per denier, a tenacity of at least 15 grams per denier, and an energy to break of at least about 22 joules per gram. It is preferred to use polyethylene filaments having molecular weights of at least 1,000,000, and more preferably at least 2,000,000. Where polypropylene filaments are used, for example, their weight average molecular weight should be at least about 750,000, preferably between about 1 and 4 million, and most preferably between about 1.5 and 2.5 million. These fibers should have a modulus of at least about 300 grams per denier, a tenacity of at least about 8 grams per denier, and an energy to break of at least about 22 joules per gram. Exemplary polyvinyl alcohol filaments have similar minimum properties to those set forth above for polyethylene. Nylon, polyacrylonitrile, polyethylene terephthalate and aramid polymers are also examples of filament polymers which are useful in this invention at minimum physical properties which are similar to those which have been described above.

It is known in the art to dress filaments for use in a protective fabric such as with elastomeric resin material in order to make them better able to contain the impact of an incoming projectile. The use of such dressed filaments is considered to be within the scope of this invention. Further, it is considered to be within the scope of this invention to provide a small proportion of the filaments of the fabrics of this invention as elastomeric filaments. Suitably, not more than about 10% of the filaments should be elastomeric, and suitably, the dressing, elastomeric or otherwise, should not be used in proportions of more than about 10% by weight based on the whole weight of the fabric of the sub-ply which has been dressed.

Using filaments of at least such minimum physical properties, sub-plies of fabric are conventionally woven from such suitable filaments. The weaving can be of any conventional structure with a plain weave being preferred. Other weave structures are usable in this invention as well. It is within the scope of this invention to provide essentially two (2) dimensional sub-plies of fabric. However, it is also within the scope of this invention to utilize sub-plies of three (3) dimensionally woven fabric. Where such three (3) dimensional fabrics are used, they may take the place of several two dimensional sub-plies. In this case, the thickness of the three dimensional fabric will be approximately equal to the thickness of the number of sub-plies of two dimensional fabrics which have been replaced.

Each of the woven sub-layers or plies should have an areal density of about 0.015 to 0.02 pound per square foot, calculated before assembly of the plies and quilting of the assembly. If there are sub-plies of non-woven fabric interspersed between some or all of the plies of woven fabric, their areal densities may be somewhat less than that of the woven fabric sub-plies, but preferably these plies of non-woven fabric also have areal densities which are similar to those of the woven fabric sub-plies. The quilting of the assembly of sub-plies will not materially change the areal density of the composite fabric as compared to the areal density of the individual sub-plies of fabric. Assembly and quilting will slightly increase the areal density of the finished composite fabric as compared to the areal density of the individual sub-plies. It is considered to be within the scope of this invention to use sub-plies of two or three dimensional fabric all of which are made of the same polymer filaments and have the same areal density, or in the alternative, some of the polymer filaments may be different and the areal density of some of the sub-plies may be different. These differences may be random, or they may proceed in an orderly fashion, such as for example from one end of the stack of sub-fabrics to the other in either direction.

In accord with this invention, a plurality of these sub-plies are individually made and stacked. It is also within the scope of this invention to make a single long woven two dimensional fabric and then turn it upon itself, serpentine fashion, to make up the stack of sub-plies of fabric. Regardless of how the stack of sub-plies is assembled, the stack is then quilted together. The quilting filaments are suitably the same filaments as are used to make the woven fabrics, but they need not be. It is desirable that the quilting filaments be inserted into the stack as a continuous line of stitching. However, it is also within the scope of this invention to discontinuously quilt stitch the plurality of sub-plies into a composite fabric according to this invention.

It is also within the scope of this invention to chemically quilt the sub-plies of fabric together to make the final quilted fabric of this invention. Chemical quilting of layers of plies of sub-fabrics are per se well known in the textile industry. It is therefore well known to apply spots or lines of binder resin at predetermined locations about the surface of a fabric and then to adhere multiple layers of such sub-fabrics together by means of these binder resins. The binder resins can be used instead of, or in combination with, textile stitch quilting. When chemical quilting is used, care should be taken to use a minimum amount of binder resin sufficient to create the quilting but to minimally impair the flexibility of the final multi-layer product.

The object of the quilting is to make the plural layers of woven fabric stay in a composite structure, and to retard the separation of individual filaments by the impact of the incoming projectile. These quilting filaments do not generally act, per se to stop incoming projectiles, but serve to hold the entire fabric structure together so that the filaments in the sub-layers, particularly the filaments in the woven sub-layers, can stop the incoming projectile. In other words, without being in any way bound by this theory of operation, it is believed that the filaments of the sub-layers actually act to stop the incoming projectile by making the projectile lose its energy and momentum. The quilting keeps these stopping filaments together to prevent the incoming projectile from pushing them aside and passing through the fabric without using up its energy in distending and/or breaking these filaments. Another important aspect of this invention is that the quilting prohibits, or at least retards, individual layers of sub-plies of fabric from separating. This insures that the multiple plies work together and greatly enhances the stopping power of the composite quilted fabric as compared to the stopping power of any individual sub-layer.

The frequency of quilting is somewhat inversely proportional to the breaking strength of the individual filaments used to make the woven fabrics and to the tightness of the weave of the sub-layers of woven fabric. Thus, to obtain the same stopping power, the tightness of the weave may be adjusted, or the frequency of the quilting may be adjusted, or the extent of the breaking strength of the filaments may be regulated. Any combination of these three parameters can be used to obtain the desired stopping power of the composite fabric of this invention.

In general, for fabrics of filaments as have been hereinbefore described, the weave should be relatively loose so as to give the fabric flexibility and breathability, and is preferably about 43 to 56 filaments per linear inch in each direction. For these filaments, the quilting should be spaced about 0.75 to 3 inches apart. The quilting is suitably on the diagonal with respect to the weave of the fabric and each line of quilting is, preferably, but not necessarily, spaced about 2 inches apart on center. Generally quilting spacing of about 0.75, preferably 1.5, to 3 inches on center is acceptable. While it is common for the individual sub-plies of fabric to be assembled with their weave in the same orientation, that is not a requirement. The individual sub-layers may be turned so that their weaves are angularly disposed relative to one another.

It has been found that about 40 to 50 sub-layers of fabric can be quilted together as aforesaid to produce the composite fabric of this invention having the strength and integrity needed to prevent the penetration of incoming projectiles on a level II basis, that is a 9 mm or a .357 magnum bullet, and still be light and flexible enough for extremely comfortable wearing. The number of sub-plies which are bound together to make up the fabric shield of this invention has been found not to be critical, but will vary depending on the level of protection desired. It has been found that at least about 80%, and preferably 100%, of these sub-layers should be woven fabrics.

It is preferred in the practice of this invention to apply a dressing to the fabric of this invention. This dressing has for its purpose to cause the filaments and the fabrics, sub-fabrics and final finished composite fabric, to be resistant to the adsorption of liquids such as water or petroleum products. It has been found that when fabrics of the type to which this invention is directed get wet with some liquid, particularly either water or a slippery organic liquid, penetration thereof by an incoming round is easier because the coefficient of friction between the individual filaments is substantially reduced. Therefore, a preferred aspect of this invention includes treating the fabric of this invention in know manner to make it resist the adsorption of liquids.

Another preferred aspect of this invention comprises subjecting either some or all of the individual sub-plies of fabric, or the final composite fabric, or both, to a calandering operation. In such an operation, which is per se known, the filaments of the woven fabric (sub-fabric or quilted compilation of sub-fabrics) to being squeezed between calander rolls. The squeezing pressure causes the fabric to flatten out and to become reduced in areal density. It also causes the individual filaments to become more spread apart and to therefore make the fabric more pliable and easier to wear.

EXAMPLES OF THE BEST MODE OF CARRYING OUT THIS INVENTION

EXAMPLE 1

In a preferred embodiment of this invention, a bullet resistant fabric was made of quilted, multilayer sub-plies of conventional polyethylene filaments having a conventional weight average molecular weight, denier, tenacity, and tensile modulus usually used in making bullet resistant fabrics. The weave employed produced a fabric with 45 yarns per inch in each direction, and an overall areal density of 0.75. 40 Pieces of this woven sub-fabric were laid one on top of the other with their weaving in alignment, making a final composite fabric product. This composite fabric was then quilted by stitching the multiple plies together with a filament which was the same as the filament used to make the sub-plies of fabric. The quilt stitchings were spaced apart about 2 inches, and this quilted product was calandered to produce a final product having an areal density of 0.85 pound per square inch.

Comparative Example 1

For comparison purposes, a second composite fabric was produced using the same number of sub-plies of the same filaments but unquilted.

Comparative Example 2

For comparison purposes, a third composite fabric was made using the same filaments as in EXAMPLE 1 but in this case, the filaments were not woven, but were non-woven sub-fabrics which were quilted in the same manner as in EXAMPLE 1.

These three samples were tested by having substantially the same weight and size projectile impacted thereon at the same impact velocity of 1175 feet per second from substantially identical 9 mm bullets. While the product of EXAMPLE 1 stopped the impacting projectile from passing through and allowed a rearward deformation of less than 44 mm, the products of the two (2) COMPARATIVE EXAMPLES passed completely through the composite fabrics.

What is claimed is:

1. A composite fabric which is able to withstand the penetration therethrough of at least one of the following projectiles:

a 9 m, 124 grain, FMJ projectile impacting the fabric at a velocity of not less than 1175 feet per second; or a .357 magnum, 158 grain, JSP projectile impacting the fabric at a velocity of not less than 1395 feet per second;

wherein said composite fabric:

has an areal density of about 0.65 to 0.87 pounds per square foot;

comprises not more than 10% by weight of matrix resin; and comprises up to about 50 sub-plies of woven sub-fabrics joined together by stitching;

wherein at least a majority of said woven sub-fabrics have each been calandered and comprise filaments having a size of about 180 to 420 denier, woven at a filament density of at least about 43 filaments per linear inch in each orthogonal direction, respectively; and wherein said composite fabric passes the level II penetration resistance test.

2. A composite fabric as claimed in claim 1 comprising substantially no matrix resin.

3. A composite fabric as claimed in claim 1 consisting essentially of joined together, calandered woven sub-plies of fabric.

4. A composite fabric as claimed in claim 1 having an areal density of about 0.75 to 0.87 pound per square foot.

5. A composite fabric as claimed in claim 1 wherein said filaments comprise filaments of ultra high molecular weight polyethylene.

6. A composite fabric as claimed in claim 1 further comprising a dressing thereof which acts to retard the adsorption of liquids into the fabric.

7. A composite fabric as claimed in claim 1 which is substantially quilted.

8. A garment shaped to fit at least a portion of a human body comprising the composite fabric as claimed in claim 1.

9. A method of protecting an object against being directly impacted by at least one of the following incoming projectiles:

a 9 mm, 124 grain, FMJ projectile impacting the fabric at a velocity of not less than 1175 feet per second; or a .357 magnum, 158 grain, JSP projectile impacting the fabric at a velocity of not less than 1395 feet per second;

which method comprises disposing between said object and said incoming projectile a composite fabric which:

has an areal density of about 0.65 to 0.87 pounds per square foot;

comprises not more that 10% by weight of a matrix resin; and comprises up to about 50 sub-plies of woven sub-fabrics joined together by stitching;

wherein at least a majority of said woven sub-fabrics have each been calendared and said calendared, woven sub-fabrics comprise filaments having a size of about 180 to 420 denier, woven at a filament density of about 43 to 56 filaments per linear inch in each orthogonal direction, respectively, and wherein said composite fabric passes the level II bullet penetration resistance test.

10. The method as claimed in claim 9 wherein said composite fabric is quilted.

11. The method as claimed in claim 9 wherein said composite fabric consists essentially of calendared sub-plies of woven fabric.

12. The method as claimed in claim 9 wherein said composite fabric is quilted.

13. A composite fabric as claimed in claim 1 which is quilted.

* * * * *